United States Patent
Das et al.

(10) Patent No.: US 8,901,274 B2
(45) Date of Patent: Dec. 2, 2014

(54) POLYIMIDE OLIGOMERS

(75) Inventors: Sajal Das, Bedminster, NJ (US); Vilas M. Chopdekar, Edison, NJ (US); Megan B. Casey, Lehighton, PA (US)

(73) Assignee: Lonza Group, Ltd., Basel (CH)

( * ) Notice: Subject to any disclaimer, the term of this patent is extended or adjusted under 35 U.S.C. 154(b) by 196 days.

(21) Appl. No.: 13/573,141

(22) Filed: Aug. 24, 2012

(65) Prior Publication Data
US 2014/0058057 A1    Feb. 27, 2014

(51) Int. Cl.
*C08G 69/26*    (2006.01)

(52) U.S. Cl.
USPC ............ 528/353; 528/340; 528/348; 528/350

(58) Field of Classification Search
USPC .................................. 528/340, 348, 350, 353
See application file for complete search history.

(56) References Cited

U.S. PATENT DOCUMENTS

| | | | |
|---|---|---|---|
| 4,206,106 A | 6/1980 | Heilman et al. | 260/30.2 |
| 5,138,028 A | 8/1992 | Paul et al. | |
| 6,274,699 B1 | 8/2001 | Meador | 528/353 |
| 6,303,744 B1 | 10/2001 | Meador et al. | |
| 6,979,721 B1 | 12/2005 | Meador et al. | 528/353 |
| 7,605,223 B1 | 10/2009 | Lincoln et al. | 528/340 |
| 7,999,060 B2 | 8/2011 | Ronk et al. | 528/353 |

FOREIGN PATENT DOCUMENTS

| | | | |
|---|---|---|---|
| JP | 61-271286 | * | 12/1986 |
| JP | 2008-063298 | * | 3/2008 |

* cited by examiner

*Primary Examiner* — Gregory Listvoyb
(74) *Attorney, Agent, or Firm* — Jack Matalon

(57) ABSTRACT

Polyimide oligomers of the general formula:

$$M\text{-}(Z\text{—}Y\text{—}X\text{—}Y\text{—}Z)_n\text{-}M$$

wherein n is an integer of 1 to 20; X comprises an aromatic diamine containing 2-4 aryl moieties, each of which contains 0-4 substituents; Z is independently the same as X or is a different aromatic diamine containing 1-4 aryl moieties, each of which contains 0-4 substituents; Y comprises an aromatic dianhydride containing 1-4 aryl moieties, each of which contains 0-4 substituents; and M is independently the same as Y or is a substituted or unsubstituted anhydride, a substituted or unsubstituted dianhydride, a substituted or unsubstituted bisimide, or a substituted or unsubstituted monomeric or oligomeric phthalonitrile.

16 Claims, No Drawings

POLYIMIDE OLIGOMERS

FIELD OF THE INVENTION

The invention pertains to polyimide oligomers and to processes for preparing and using such oligomers.

BACKGROUND OF THE INVENTION

Polyimide oligomers are synthetic organic resins characterized by repeating imide linkages. Typically, such oligomers are end-capped with polymerizable chemical groups such as vinyl groups, amines, acetylenic groups, anhydride groups and the like. Polyimides prepared by crosslinking the oligomers are known for their outstanding chemical and physical properties, particularly their high temperature oxidative stability and strength. Polyimides are widely used as adhesives, molded articles, pre-cured films and fibers, curable enamels, laminating resins and as matrices for fiber-reinforced composites.

Prior art polyimide oligomers are disadvantageous in several respects. Typical prior art polyimide oligomers:

1. Are difficult to process. In contradistinction, the polyimide oligomers of the invention are readily processable as a melt and are thus suitable for resin transfer molding, resin infusion and other liquid processes. Moreover, the polyimide oligomers of the invention may be dissolved in common organic solvents such as methyl ethyl ketone, dimethyl formamide, glycol ethers, n-methylpyrrolidone and the like, thereby facilitating the processing of temperature-sensitive materials.
2. Require additional components in order to prepare cured polyimide articles. In contradistinction, the polyimide oligomers of the invention may be readily converted into the desired polyimide articles without any further components.
3. Require the addition of crosslinking agents to cure the oligomers. In contradistinction, the polyimide oligomers of the invention are readily curable by heat alone.
4. Have relatively high ionic conductivity. In contradistinction, the polyimide oligomers have relatively low ionic conductivities, generally in the range of about 50 to about 500 microSiemens per cm after aqueous ion extraction via methods typically used by those skilled in the art. Such low ionic conductivity makes the polyimide oligomers of the invention particularly suitable for a wide variety of encapsulation and molding applications, especially for the fabrication of parts for hybrid and electric vehicle applications.

In addition, the polyimide oligomers of the invention are suitable for IC substrates and lead-free and halogen-free high layer count substrates, as well as for tooling applications and aerospace applications, friction materials and abrasive binders.

DETAILED DESCRIPTION OF THE INVENTION

The polyimide oligomers of the invention have the following general structure:

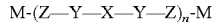

M-(Z—Y—X—Y—Z)$_n$-M wherein n is an integer of 1 to 20; X comprises an aromatic diamine containing 2-4 aryl moieties, each of which contains 0-4 substituents; Z is independently the same as X or is a different aromatic diamine containing 1-4 aryl moieties, each of which contains 0-4 substituents; Y comprises an aromatic dianhydride containing 1-4 aryl moieties, each of which contains 0-4 substituents; and M is independently the same as Y or is a substituted or unsubstituted anhydride, a substituted or unsubstituted dianhydride, a substituted or unsubstituted bisimide, or a substituted or unsubstituted monomeric or oligomeric phthalonitrile.

Preferably, n has a value of 1 to 10; most preferably, n has a value of 5.

The substituents for X, if present, are independently $C_1$-$C_5$ alkyl, halogens, O or $SO_2$. Suitable examples of X include 4,4'-methylene dianiline; 4,4'-diamino diphenyl ether; 4,4'-diamino diphenyl sulfone; 4,4'-methylene bis(3-chloro-2,6-diethylaniline); 4,4'-methylene bis(2,6-diethylaniline); 4,4'-methylene bis(2,6-diisopropylaniline); 4,4'-methylene bis(2-methyl-6-isopropyl)aniline; 4,4'-methylene bis(3-chloro-2,6-diethylaniline); 4,4'-propane-2,2-diylbis(4,1-phenyleneoxy)dianiline; diethyl toluene diamine; and 4,4'-methylene bis(2-chloroaniline). Preferably, X is 4,4'-methylene bis(2,6-diethylaniline); 4,4'-methylene bis(2-methyl-6-isopropyl) aniline; or 4,4'-methylene bis(2,6-diisopropylaniline). Most preferably, X comprises 4,4'-methylene bis(2,6-diethylaniline) or 4,4'-methylene bis(2-methyl-6-isopropylaniline).

The substituents for Z, if present, may be $C_1$-$C_5$ alkyl or O. Suitable examples of Z include 1,3-phenylene diamine; 1,4-phenylenediamine; 3,5-diethyl-2,5-diaminotoluene; 3,5-diethyl-2,6-diaminotoluene; 1,3-bis(3-aminophenoxy)benzene; and 4,4'-methylene-dianiline. Preferably, Z is 1,3-phenylene diamine; 1,3-bis(3-aminophenoxy)benzene; 1,4-phenylenediamine; or 4,4'-methylene-dianiline. Most preferably, Z is 1,3-phenylene diamine or 1,3-bis(3-aminophenoxy)benzene.

The substituents for Y, if present, may be $C_1$-$C_5$ alkyl, halogens, O or $SO_2$. Suitable examples of Y include bisphenol A dianhydride; benzophenone tetracarboxylic dianhydride; pyromellitic dianhydride; 4,4'-oxybiphthalic anhydride; 3,3', 4,4'-diphenylsulfone tetracarboxylic dianhydride; 4,4'-(hexafluoroisoproylidene) biphthalic anhydride; 4,4'-biphthalic anhydride; and hydroquinone biphthalic anhydride. Preferably Y is bisphenol A dianhydride; pyromellitic dianhydride; or 4,4'-(hexafluoroisoproylidene)biphthalic anhydride. Most preferably, Y is bisphenol A dianhydride, pyromellitic dianhydride or a mixture of such dianhydrides.

Suitable examples of M include maleic anhydride, 4-phenylethynyl phthalic anhydride, 1,3-bis(3,4-dicyanophenoxy) benzene and 4,4'-bismaleimidodiphenyl-methane. Preferably M comprises maleic anhydride or 4,4'-bismaleimidodiphenyl-methane.

The polyimide oligomers of the invention may be readily prepared by the following general procedure:

In the first step, the selected choice of X, i.e. an aromatic diamine such as 4,4'-methylene bis(2,6-diethylaniline), is reacted with the selected choice of Y, i.e. an aromatic dianhydride such as bisphenol A dianhydride. This reaction is typically carried out in the presence of a non-reactive solvent, e.g. n-methyl pyrrolidone. The reaction is typically carried out at room temperature, with stirring of the components over a period of about 0.5 to 4 hours. The reaction is exothermic and results in the formation of an amic acid. Thereafter, an additional non-reactive solvent such as toluene and a catalyst such as p-toluenesulfonic acid are added. The reaction mixture is heated, with stirring, at reflux conditions for about 6-15 hours and the by-product water is removed as an azeotrope, thereby resulting in the formation of an anhydride-capped imide.

In the second step, the reaction mixture is cooled to room temperature and thereafter, the selected choice of the Z component, e.g. 1,3-phenylene diamine, is added with a small quantity of a non-reactive solvent such as n-methyl pyrrolidone. The reaction mixture is stirred for about 0.5 to 4 hours (the reaction is slightly exothermic) and a catalyst such as p-toluenesulfonic acid is added. The reaction mixture is heated, with stirring, at reflux conditions for about 6-15 hours and the by-product water is removed as an azeotrope, thereby resulting in the formation of an amine-capped oligomer.

In the third step, the selected choice of the M component, an anhydride such as maleic anhydride is added to the reaction mixture and the resulting reaction mixture is stirred for about 0.5-4 hours (the reaction is slightly exothermic). Then, an amine such as triethyl amine is added with stirring and another anhydride such as acetic anhydride is added with stirring and a catalyst such as p-toluenesulfonic acid. The resultant reaction mixture is heated at a moderate temperature of about 55° C. for about 0.5-4 hours and then stirred for about 6-15 hours with any heating.

The polyimide oligomer of the invention is then recovered by adding an alcohol such as methanol followed by stirring for about 0.5-1 hour. The product is isolated by filtration, washed with additional methanol and dried under vacuum at a moderate temperature, e.g. 70° C. Typically, the yield of the polyimide oligomer of the invention will be about 90%.

Alternatively, the recovered polyimide oligomer is then added to the selected choice of the M component, a bisimide or phthalonitrile. The mixture is heated to melting and stirred for about 0.5 to 1 hour.

The polyimide oligomers of the invention may be molded in the melt phase or by using common organic solvents such as those stated above.

The polyimide oligomers of the invention may be readily cured by the application of heat, e.g. at a temperature of 175 to 250° C. or with the use of common crosslinking agents such as organic peroxides, transition metal complexes and the like.

The following non-limiting examples shall serve to illustrate the various embodiments of the invention. Unless otherwise stated, all parts and percentages are on a weight basis.

Example 1

Preparation of Anhydride End-Capped Polyimide Oligomer of 1,3-Phenylene Diamine

A 1-l 4-neck flask was set up with a stirrer, heating mantle, nitrogen blanket, thermometer, Dean Stark trap, condenser, etc. and was purged with nitrogen. The flask was charged with 3.1 g (0.1 mol) of 4,4'-methylene bis(2,6-diethylaniline) powder and 300 g of anhydrous n-methyl pyrrolidone and stirred for 10 min. To the resultant clear solution were added 104.1 g (0.2 mol) of bisphenol A dianhydride with stirring. The beaker was rinsed with 50 g of n-methyl pyrrolidone and the rinsate was added to the reaction flask. The flask was stirred for 2 hours resulting in the formation of an amic acid (the reaction was exothermic—the temperature rose from 22° C. to 33° C.).

The flask was charged with 100 g toluene and 0.2 g of p-toluenesulfonic acid catalyst and the flask was heated, with stirring, to a reflux temperature of 155° C. for 12 hours to azeotrope the by-product water. 3.8 ml of by-product water were removed from the flask which now contained the anhydride-capped imide.

In the next step, the solution in the flask was cooled to room temperature. Thereafter, 21.6 g (0.2 mol) of 1,3-phenylene diamine powder were added. The beaker was rinsed with 50 g of n-methyl pyrrolidone and the rinsate was added to the reaction flask. The solution was stirred for 2 hours (the reaction was exothermic—the temperature rose from 23° C. to 32° C.) and 0.1 g of p-toluenesulfonic acid catalyst was added to the flask. The flask was heated with stirring to reflux for 12 hours and the by-product water (4.3 ml) was removed as an azeotrope.

The solution was cooled to room temperature and was added, with stirring, to 500 ml methanol to precipitate the product. The amine-capped polyimide oligomer was dried under vacuum at 70° C. The product weighed 135 g (90% yield).

Example 2

Preparation of the BMI of the Anhydride End-Capped Polyimide Oligomer from Example 1

The polyimide oligomer from Example 1 was converted to its bis-maleimide ("BMI") by the following procedure.

Example 1 was repeated without recovery of the polyimide oligomer. To the reaction mixture was added 21 g (0.214 mol) of maleic anhydride, and the reaction mixture was stirred for 2 hours. The reaction was slightly exothermic—the temperature rose from 24° C. to 31° C. Thereafter, 7 g of triethyl amine were added and the reaction mixture was stirred for 15 min. Then, 26.5 g of acetic anhydride were slowly added with stirring for 30 min. The reaction mixture was then stirred for 12 hours without the addition of any heat.

The resultant solution was then added to 2 liters of methanol with stirring and stirring continued for an additional 30 min. The resultant polyimide oligomer was isolated by filtration, washed with 500 ml of fresh methanol and dried under vacuum at 70° C. The product weight was 149 g (91.4% yield).

Example 3

Preparation of Anhydride End-Capped Polyimide Oligomer of 1,3-APB

Example 1 was repeated using 58.4 g (0.2 mol) of 1,3-bis (3-aminophenoxy)benzene ("1,3-APB") in place of the 1,3-phenylene diamine. All other ingredients and reaction conditions were the same as employed in Example 1. The yield of the 1,3-APB end-capped polyimide oligomer product was 186.3 g (91.8%).

Example 4

Preparation of the BMI of the Anhydride End-Capped Polyimide Oligomer from Example 3

The polyimide oligomer of Example 3 was converted to its bis-maleimide ("BMI") by the following procedure.

Example 3 was repeated without recovery of the polyimide oligomer. To the reaction mixture was added 21 g (0.214 mol) of maleic anhydride, and the reaction mixture was stirred for 2 hours. The reaction was slightly exothermic—the temperature rose from 24° C. to 31° C. Thereafter, 7 g of triethyl amine were added and the reaction mixture was stirred for 15 min. Then, 26.5 g of acetic anhydride were slowly added with stirring for 30 min. The reaction mixture was then stirred for 12 hours without the addition of any heat.

The resultant solution was then added to 2 liters of methanol with stirring and stirring continued for an additional 30 min. The BMI end-capped polyimide oligomer of the invention was isolated by filtration, washed with 500 ml of fresh methanol and dried under vacuum at 70° C. The product weight was 178 g (89% yield).

The preceding specific embodiments are illustrative of the invention. It is, however, to be understood that other expedients known to those skilled in the art or disclosed herein may be employed without departing from the spirit of the invention or the scope of the claims which follow.

What is claimed is:

1. A polyimide oligomer having the general structure:

M-(Z—Y—X—Y—Z)$_n$-M wherein:
n is an integer of 1 to 20;
X comprises an aromatic diamine selected from the group consisting of 4,4'-methylene bis(2,6-diethylaniline and 4,4"-methylene bis(2-methyl-6-isopropylaniline;
Z is independently the same as X or is a different aromatic diamine containing 1-4 aryl moieties, each of which contains 0-4 substituents;
Y comprises an aromatic dianhydride containing 1-4 aryl moieties, each of which contains 0-4 substituents; and
M is independently the same as Y or is a substituted or unsubstituted anhydride, a substituted or unsubstituted dianhydride, a substituted or unsubstituted bisimide, or a substituted or unsubstituted monomeric or oligomeric phthalonitrile.

2. The oligomer of claim 1 wherein n is an integer of 1 to 10.

3. The oligomer of claim 2 wherein n is 2.

4. The oligomer of claim 1 wherein the substituents for Z, if present, are selected from the group consisting of $C_1$-$C_5$ alkyl and O.

5. The oligomer of claim 1 wherein Z is selected from the group consisting of 1,3-phenylene diamine; 1,4-phenylenediamine; 3,5-diethyl-2,5-diaminotoluene; 3,5-diethyl-2,6-diaminotoluene; 1,3-bis(3-aminophenoxy)benzene; and 4,4'-methylenedianiline.

6. The oligomer of claim 4 wherein Z is selected from the group consisting of 1,3-phenylene diamine; 1,3-bis(3-aminophenoxy)benzene; 1,4-phenylenediamine; and 4,4'-methylene-dianiline.

7. The oligomer of claim 5 wherein Z comprises 1,3-phenylene diamine.

8. The oligomer of claim 6 wherein Z comprises 1,3-bis(3-aminophenoxy)benzene.

9. The oligomer of claim 1 wherein the substituents for Y, if present, are selected from the group consisting of $C_1$-$C_5$ alkyl, halogens, O and $SO_2$.

10. The oligomer of claim 1 wherein Y is selected from the group consisting of bisphenol A dianhydride; benzopohenone tetracarboxylic dianhydride; pyromellitic dianhydride; 4,4'-oxybiphthalic anhydride; 3,3',4,4'-diphenylsulfone tetracarboxylic dianhydride; 4,4'-(hexafluoroisopropylidene)biphthalic anhydride; 4,4'-biphthalic anhydride; and hydroquinone biphthalic anhydride.

11. The oligomer of claim 9 wherein Y is selected from the group consisting of bisphenol A dianhydride; pyromellitic dianhydride; and 4,4'-(hexafluoroisopropylidene)biphthalic anhydride.

12. The oligomer of claim 10 wherein Y comprises bisphenol A dianhydride.

13. The oligomer of claim 10 wherein Y comprises pyromellitic dianhydride.

14. The oligomer of claim 1 wherein M is independently the same as Y or is a substituted or unsubstituted anhydride, a substituted or unsubstituted dianhydride, a substituted or unsubstituted bisimide, or a substituted or unsubstituted monomeric or oligomeric phthalonitrile.

15. The oligomer of claim 14 wherein M is selected from the group consisting of maleic anhydride, 4-phenylethynyl phthalic anhydride, 4,4'-bismaleimidodiphenyl-methane and 1,3-bis(3,4-dicyanophenoxy)benzene.

16. The oligomer of claim 15 wherein M comprises maleic anhydride.

\* \* \* \* \*